UNITED STATES PATENT OFFICE 2,557,721

9,10-DIHYDROPTERIDINES AND PROCESS OF PREPARING SAME

William Robert Boon and William Glynne Moss Jones, Manchester, England, assignors to Imperial Chemical Industries Limited, a corporation of Great Britain No Drawing. Application June 1, 1948, Serial No. 30,516. In Great Britain June 13, 1947

6 Claims. (Cl. 260—251.5)

This invention relates to the manufacture of new pyrimidine derivatives and in particular to the manufacture of new 5-nitro-4- or 6-β-ketonylamino- or β-aldehydo-aminopyrimidines of the constitutional formula displayed below, and of other pyrimidine derivatives which are obtainable by use of the said 5-nitropyrimidines as starting materials.

The new 5-nitro-4- or 6-β-ketonylamino, or β-aldehydoamino-pyrimidines of the invention have the general formula here shown:

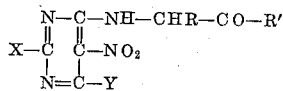

(wherein allowance is to be made for alternative arrangement of double bonds) wherein X and Y stand for hydrogen, halogen, alkyl, amino, or substituted amino, provided that of X and Y one stands for halogen, but both do not stand for halogen at the same time, and wherein R and R' stand for hydrogen or a hydrocarbon radical.

The process of the invention comprises, for the production of the said new 5-nitropyrimidines, reaction of a suitable 4- or 6-halogeno-5-nitropyrimidine with an α-amino-aldehyde or ketone of the formula NH₂—CHR—CO—R', or a functional derivative thereof, e. g. an acetal.

By a further feature of the invention such of the new 5-nitro-4- or 6-β-ketonylamino- or β-aldehydo-aminopyrimidines as carry in position 2, or in position 4 or 6 as the case may be, a halogen atom is reacted with ammonia, or amines, to give, respectively, 2-, 4- or 6-monoamino (or substituted amino)-5-nitro-4- or 6-β-ketonylamino- or β-aldehydo-aminopyrimidines.

By yet a further feature of the invention any one of the above new 5-nitropyrimidines is reduced whereby the 5-nitro group is converted into a 5-amino group, which then, as formed takes part in a ring-forming reaction with production of new derivatives of 9:10-dihydropteridin of the formula:

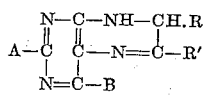

wherein R and R' have the significance given above and wherein A and B may be hydrogen, halogen, alkyl, amino or substituted amino provided that both A and B be not halogen or alkyl at the same time.

The products of the invention are of value either as pharmacologically active compounds or as intermediates for the manufacture of pharmacologically active compounds.

The invention is illustrated by the following examples in which the parts are by weight.

Example 1

5 parts of 2,6-dichloro-5-nitro-4-methylpyrimidine are dissolved in 50 parts of dry acetone and 6 parts of sodium bicarbonate are added to the solution. 3 parts of aminoacetone hydrochloride are added to the mechanically stirred mixture during 90 minutes. The mixture is filtered and the filtrate is concentrated under reduced pressure until crystallisation takes place. The crystalline product so obtained is separated and is recrystallised from a mixture of ether, ethyl acetate and light petroleum and 2-chloro-4-methyl-5-nitro-6-acetonyl - aminopyrimidine thus obtained as feathery needles, M. P. 108° C.

Example 2

9 parts of 2-chloro-4-methyl-5-nitro-6-acetonylaminopyrimidine are dissolved in 100 parts of dioxan, and 5 parts of diethylamine are added. The mixture is allowed to stand for 12 hours at room temperature and the crystalline product of reaction is removed by filtration and is recrystallised from a mixture of ether, ethyl acetate and light petroleum. The product is 2-diethylamino-4-methyl-5-nitro-6-acetonylaminopyrimidine, M. P. 117–118° C.

Example 3

7.7 parts of 2-diethylamino-4-methyl-5-nitro-6-acetonylaminopyrimidine are dissolved in 200 parts by weight of dioxan and 3 parts of Raney nickel catalyst are added. The mixture is shaken in an atmosphere of hydrogen until absorption of hydrogen ceases. The mixture is then filtered and the filtrate concentrated under reduced pressure at 50° C. The crystalline product so obtained is recrystallised from light petroleum. 2 - diethylamino-6,8-dimethyl-9,10-dihydropteridin is thus obtained, M. P. 119–121° C.

Example 4

5 parts of 2,6-dichloro-5-nitropyrimidine are dissolved in 50 parts of dry acetone and 6 parts of sodium bicarbonate are added to the solution. 3.5 parts of aminoacetone hydrochloride are added to the mechanically stirred mixture during 2 hours. The mixture is then filtered and the filtrate is concentrated under reduced pressure until crystallisation takes place. It is then filtered and the solid is recrystallised from light petroleum and 2 - chloro - 5-nitro-6-acetonyl-aminopyrimi-

3 dine is thus obtained in the form of needles, M. P. 129–131° C.

Example 5

2.2 parts of 2-chloro-5-nitro-6-acetonyl-aminopyrimidine are dissolved in 20 parts of dioxan and 1.4 parts of diethylamine are added dropwise to the cooled solution. The mixture is allowed to stand for 12 hours and is then poured into water and the solid product is filtered off and crystallized from a mixture of ethyl acetate and light petroleum. 2-diethylamino-5-nitro-6-acetonylaminopyrimidine is obtained in the form of needles of M. P. 119° C.

Example 6

5 parts of 2-chloro-5-nitro-6-acetonylamino-pyrimidine are dissolved in 20 parts of dioxan and 4.5 parts of benzylamine are added dropwise to the cooled solution. The mixture is then allowed to stand for 12 hours and is then poured into water and the insoluble solid is filtered off and recrystallized from ethanol. 2-benzylamino-5-nitro-6-acetonylamino-pyrimidine is obtained in the form of needles of M. P. 162° C.

Example 7

3.5 parts of 2-diethylamino-5-nitro-6-acetonylaminopyrimidine are dissolved in 50 parts of dioxan and 2 parts of Raney nickel catalyst are added to the solution. The mixture is then shaken in an atmosphere of hydrogen until absorption of hydrogen ceases. The catalyst is filtered off and the filtrate is evaporated. The solid residue is re-crystallized from methanol and 2-diethylamino-8-methyl-9,10-dihydropteridin is obtained of M. P. 158° C.

Example 8

5 parts of 2-methyl-4,6-dichloro-5-nitropyrimidine are dissolved in 50 parts of acetone and 6 parts of sodium bicarbonate are added to the solution. 2.8 parts of aminoacetone hydrochloride are then added to the stirred mixture during 2 hours. The mixture is filtered and the filtrate is dried over anhydrous magnesium sulphate. It is then filtered and the filtrate is evaporated. The solid residue is extracted with ether and the ether is distilled from the extract. The residual solid is recrystallized from a mixture of ether and light petroleum and 2-methyl-4-chloro-5-nitro-6-acetonylaminopyrimidine is obtained in the form of yellow prisms, of M. P. 84° C.

Example 9

10 parts of 2-chloro-5-nitro-6-acetonylaminopyrimidine are dissolved in 50 parts of dioxan. 30 parts of an 8% aqueous solution of ammonia in alcohol are added, and the mixture is allowed to stand for several hours. The solid is then filtered off, washed with water and recrystallized from dioxan. 2-amino-5-nitro-6-acetonylaminopyrimidine is obtained of M. P. 214° C.

Example 10

10 parts of 2-amino-5-nitro-6-acetonylaminopyrimidine are dissolved in 100 parts of dimethylformamide and 2 parts of Raney nickel catalyst are added to the solution. The mixture is then shaken in an atmosphere of hydrogen until absorption of hydrogen ceases. The catalyst is filtered off and the filtrate is evaporated in vacuo. The residue is recrystallized from water to give 2-amino-8-methyl-9,10-dihydropteridin, which decomposes without melting on heating above 210° C.

Found: C, 51.3; H, 5.4; N, 44.2. $C_7H_9N_5$ requires: C, 51.5; H, 5.5; N, 43.0%.

Example 11

10 parts of 2,6-dichloro-5-nitropyrimidine are dissolved in 150 parts of ether, and 11 parts of aminoacetophenone hydrochloride are added gradually in the presence of an aqueous suspension of sodium bicarbonate prepared from 10.3 parts of sodium bicarbonate and 50 parts of water. The solid reaction product is filtered off and dried in vacuo. On recrystallization from a mixture of ethyl acetate and light petroleum (B. P. 60–80° C.) 2-chloro-5-nitro-6-(benzoylamino)methylpyrimidine of M. P. 173° C. is obtained.

Example 12

3 parts of 2-chloro-5-nitro-6-(benzoylamino)-methylpyrimidine are dissolved in 25 parts of dioxan, and 3 parts of benzylamine added gradually with ice cooling. After 3 hours' standing the yellow solid product is filtered off, washed with water and recrystallized from dioxan. 2-benzylamino-5-nitro-6-(benzoylamino)-methylpyrimidine has a melting point of 189° C.

Example 13

1 part of 2-benzylamino-5-nitro-6-(benzoylamino)methylpyrimidine is dissolved in 10 parts of dimethyl formamide and the solution is shaken in an atmosphere of hydrogen in the presence of 1 part of Raney nickel catalyst. The catalyst is then filtered off and the solution is evaporated in vacuo. The solid residue is recrystallised from dioxan to give 2-benzylamino-8-phenyl-9,10-dihydropteridin of M. P. 242° C.

Example 14

14 parts of 2,6-dichloro-5-nitropyrimidine are dissolved in 100 parts of dry acetone and 18 parts of sodium bicarbonate are added. 10 parts of 2-aminobutanone are gradually added to the stirred mixture with ice cooling and after the addition, the stirring is continued for 2 hours. The mixture is then filtered and the filtrate is dried over sodium sulphate and then evaporated in vacuo. The solid residue is recrystallised from a mixture of ethyl acetate and light petroleum (B. P. 60–80° C.) and gives 2-chloro-5-nitro-6-(α-acetyl)-ethylaminopyrimidine, M. P. 101–2° C.

Example 15

20 parts of 2,6-dichloro-5-nitropyrimidine are dissolved in 100 parts of ether and 15 parts of aminoacetal are gradually added with vigorous shaking in the presence of an aqueous suspension of sodium bicarbonate prepared from 20 parts of sodium bicarbonate and 100 parts of water. The ethereal layer is separated off and dried over anhydrous sodium sulphate. Distillation of the ether leaves 2-chloro-5-nitro-6-β-diethoxyethylaminopyrimidine as a mobile oil.

Example 16

10 parts of 2-chloro-5-nitro-6-β-diethoxyethylaminopyrimidine are dissolved in 50 parts of dioxan. 5.0 parts of diethylamine are gradually added and the mixture is allowed to stand for 3 hours and is then poured into water. The solid product is filtered off and recrystallised from ethyl alcohol to give 2-diethylamino-5- nitro-6-β-diethoxyethylaminopyrimidine of M. P. 50° C.

Example 17

20 parts of 2,6-dichloro-5-nitropyrimidine are dissolved in 100 parts of ether and 17.5 parts of aminothioacetal are gradually added with vigorous shaking in the presence of an aqueous suspension of sodium bicarbonate prepared from 20 parts of sodium bicarbonate and 100 parts of water. The ethereal layer is then separated and after drying over anhydrous sodium sulphate the solvent is distilled in vacuo. There remains 2-chloro-5-nitro-6-β-diethylthioethylaminopyrimidine as a mobile oil.

Example 18

10 parts of 2-chloro-5-nitro-6-β-diethylthioethylaminopyrimidine are dissolved in 50 parts of ethanol and 10 parts of 10% alcoholic ammonia are added. After 3 hours standing the product is diluted with water and the solid is filtered off and recrystallised from ethanol to give 2-amino-5-nitro-6-β-diethylthioethylaminopyrimidine of M. P. 169° C.

Example 19

4.9 parts of 4,6-dichloro-5-nitropyrimidine are dissolved in 45 parts of anhydrous acetone and the solution is mixed with 6.3 parts of sodium bicarbonate and 5.0 parts of anhydrous sodium sulphate. 2.8 parts of aminoacetal hydrochloride are then added during 30 minutes with stirring. Stirring is continued for a further 2 hours after the addition is complete. The mixture is then filtered and the filtrate is evaporated to dryness under reduced pressure. The residue is extracted with hot light petroleum and there is obtained 4-chloro-5-nitro-6-acetonylaminopyrimidine of M. P. 60-61° C.

The 4,6-dichloro-5-nitropyrimidine may be prepared from 4,6-dihydroxypyrimidine by nitration followed by treatment of the so-obtained 4,6-dihydroxy-5-nitropyrimidine with phosphorus oxychloride in presence of dimethylaniline. It has M. P. 101-102° C.

I claim:

1. Pteridin derivatives of the general formula:

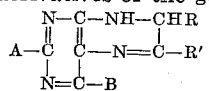

wherein R and R' stand for a radical from the group consisting of hydrogen, lower alkyl and monocyclic aryl, A stands for a radical from the group consisting of hydrogen, halogen, alkyl, amino, and substituted amino, and B stands for a radical from the group consisting of hydrogen, alkyl, amino and substituted amino, provided if A is alkyl then B is not alkyl and if A is hydrogen then B is not hydrogen.

2. 2-diethylamino-6,8-dimethyl-9,10-dihydropteridin.

3. 2-diethylamino-8-methyl-9,10-dihydropteridin.

4. 2-amino-8-methyl-9,10-dihydropteridin.

5. A process for the manufacture of new derivatives of 9,10-dihydropteridine as claimed in claim 1, which comprises reducing a pyrimidine derivative having the general formula:

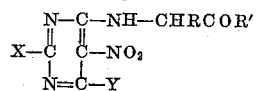

wherein one of the symbols X and Y stands for a halogen atom and the other symbol stands for a radical from the group consisting of hydrogen, alkyl, amino, and substituted amino, R and R' stand for a radical from the group consisting of hydrogen, lower alkyl and monocyclic aryl, and, thereafter, recovering the pteridine derivative from the reaction mixture.

6. 2-benzylamino-8-phenyl-9,10-dihydropteridine.

WILLIAM ROBERT BOON.
WILLIAM GLYNNE MOSS JONES.

No references cited.